UNITED STATES PATENT OFFICE.

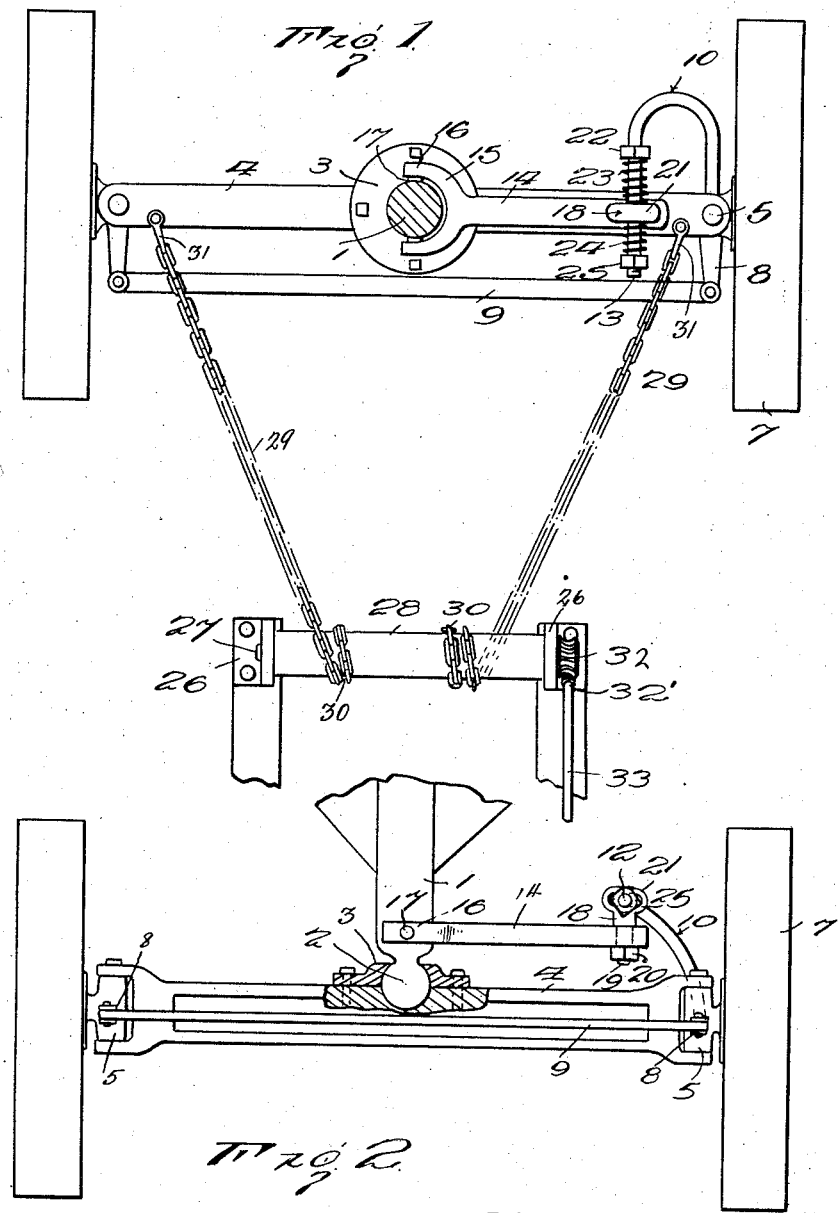

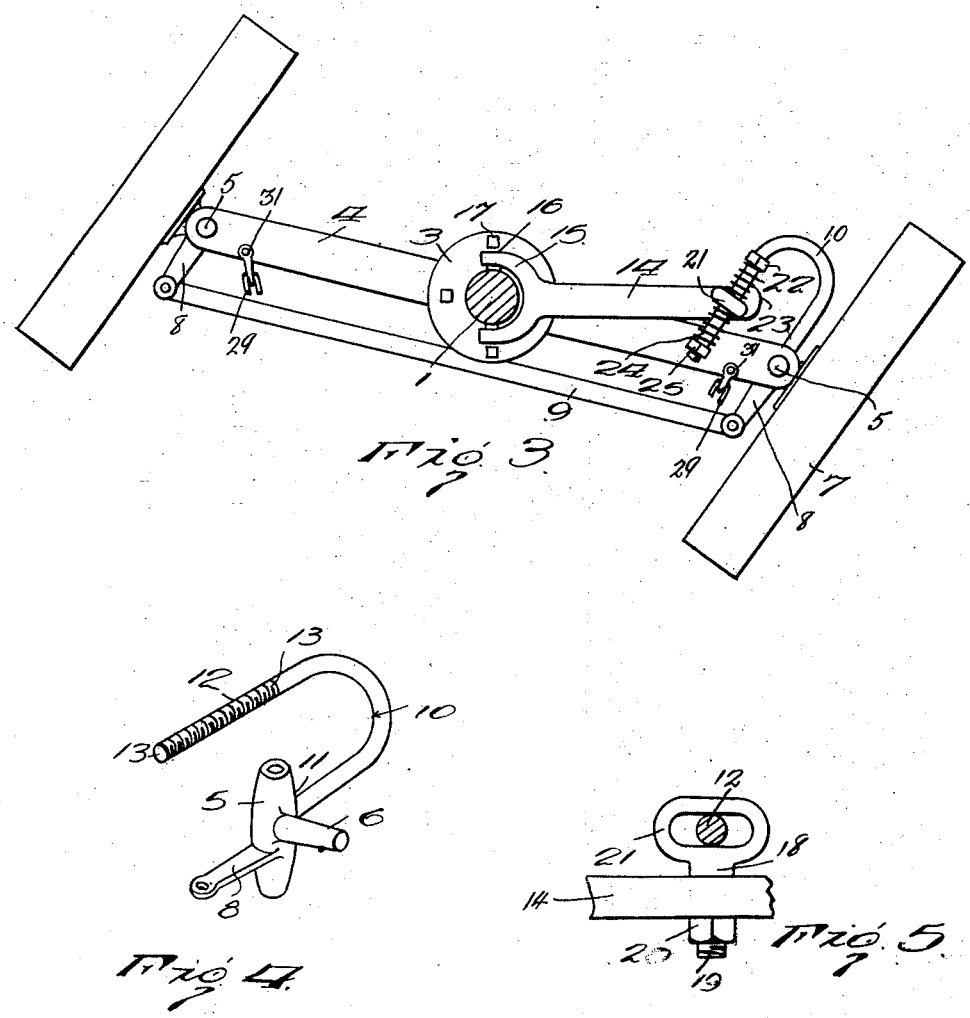

FRANK G. PROCUNIER, OF DE SOTO, ILLINOIS, ASSIGNOR OF ONE-HALF TO ROGER Q. KIMMEL, OF ELKVILLE, ILLINOIS.

COMPOUND-ENGINE GUIDE.

1,340,740.   Specification of Letters Patent.   Patented May 18, 1920.

Application filed March 1, 1919. Serial No. 280,172.

*To all whom it may concern:*

Be it known that I, FRANK G. PROCUNIER, a citizen of the United States, residing at De Soto, in the county of Jackson and State of Illinois, have invented certain new and useful Improvements in Compound-Engine Guides, of which the following is a specification.

The present invention comprehends generally improvements in that class of apparatus known as motor vehicles and more particularly relates to a compound engine guide.

The invention has for one of its objects to provide a mechanism of the above mentioned character designed to lessen the amount of labor or exertion required in turning a tractor engine or other motor vehicle and enables the operator thereof to turn in much less time by requiring fewer turns of the steering wheel.

Another object of the invention contemplates the provision of a mechanism of the above mentioned character designed to produce the combined effects of the conventional steering mechanism of an automobile and the chain roller or drum steering means for tractor use, having the strength of the latter and the quick action of the former.

Another object of the invention is the production of a mechanism of the above character embodying a pivoted front axle with a chain and drum guide means in connection therewith while in addition steering knuckles are mounted on the ends of the front axle and operably connected with the front bolster so as to be operated upon the turning of the front axle and in consequence permits of a considerably shorter turn being made.

Among the other aims and objects of this invention may be recited the provision of a device of the above mentioned character with a view to compactness and wherein the number of parts are comparatively few, the construction simple, the cost of production low and the efficiency high.

Other objects, as well as the nature, characteristic features and scope of this invention will be more readily apparent from the following description taken in connection with the accompanying drawings and pointed out in the claims, forming a part of this specification.

The invention is clearly illustrated in the accompanying drawings, in which:—

Figure 1 is a top plan of the improved guide or steering mechanism, the front bolster being shown in section, Fig. 2 is a rear elevational detail of the front axle, partly in section, Fig. 3 is a top plan detail of the improved guiding or steering mechanism showing the relative position of the wheels and the front axle when the latter is turned.

Fig. 4 is a perspective detail of the steering mechanism with the improved steering arm connected thereto, and Fig. 5 is an enlarged fragmentary elevational detail showing the means for operably connecting the guide and steering arms together.

Similar characters of reference are employed in all of the above described views to indicate corresponding parts.

Referring now, more particularly, to the accompanying drawings there is illustrated the front bolster 1 of a tractor engine or other motor vehicle which desirably terminates at its lower end in a ball 2 swiveled in turn in a socket 3 on the upper surface and medially of the ends of the front axle 4 thereby pivoting the front axle to the bolster. Steering knuckles 5 are operably mounted in the ends of the front axle 4 being formed with stub-axles 6 on which are rotatably arranged front supporting wheels 7. The steering knuckles are also formed with steering arms 8 which are operably connected to each other by means of a connecting rod 9 so that when one steering knuckle is turned the other will be moved therewith in a corresponding direction.

As intimated, improved means has been employed for operably connecting one of the steering knuckles with the bolster so as to produce turning of the knuckles at the time the front axle is turned. In reducing this feature of the invention to practice a substantially U-shaped steering arm 10 is employed being joined as at 11 with one of the steering knuckles and desirably projected forwardly, inwardly and thence rearwardly so as to lie above the adjacent end of the front axle as indicated in the drawings. In addition, the free rearwardly extending portion 12 of the arm is provided with spaced threaded portions 13 for a purpose that will presently appear. A guide arm 14 is employed, the inner end being forked as at 15, the arms provided thereby terminating in bearings 16 which are swingably arranged for vertical movement about opposed trunnions 17 which extend from the forward and rear faces of the bolster 1. In operably connecting the outer end of the guide arm 14 with the steering arm 10, suitable means such as an I-bolt 18 is employed, the lower reduced end of the shank of the bolt being rotatably arranged through a vertical opening in the guide arm, the depending reduced portion being threaded as at 19 and engaged by a suitable retaining element such as a nut 20 so as to maintain the bolt perpendicularly with respect to the arm 14 and its rectangular head 21 above and longitudinally thereof as indicated in the drawings. The free portion 12 is receivable through the rectangular horizontally disposed head or eye 21 but preparatory to this engagement a suitable adjustable element such as a nut 22 is arranged on the inner threaded portion 13 while a coiled expansion spring 23 is also arranged about the free portion 12 and positioned between the element 22 and the adjacent face of the eye 21. A similar spring 24 is arranged about the extreme outer portion of the steering arm 10 while the outer threaded portion is finally engaged by another adjusting element or nut 25, the springs being of similar tension and are designed to prevent shock to the steering device and provide a small amount of flexibility. By this arrangement it is apparent that upon the turning of the axle, the arm 14 being prevented from having horizontal swinging movement will in effect remain stationary with respect to the turning of the axle and by reason of the connection between this guide arm with the peculiarly constructed steering arm as well as the front wheels 7 will turn so that the wheels will be positioned at corresponding angles relative to the front axle such as shown in Fig. 3 which permits of a comparatively sharp turn being made and also permits of an accurate and easy guiding or steering of the tractor engine or motor vehicle (not shown).

In operating or turning the front axle, spaced bearing brackets 26 depend from the chassis (not shown) while journaled therein are the opposed trunnions 27 of a roller or drum 28. Suitable flexible elements such as chains 29 have their inner ends slightly wound as at 30 about the drum with their outer ends connected as at 31 near the respective extremities of the axle 4. A worm wheel 32 is mounted on the projecting end of one trunnion and is engaged by a worm 32' formed on the adjacent end of the steering rod 33 which is adapted to receive the steering wheel (not shown). By this arrangement, when the rod 33 is turned, owing to the worm meshing with the worm wheel 32, the drum will be rotated in a corresponding direction, unwinding one of the chains and winding the other at the same time exerting a pull on one end of the axle 4 so as to turn the axle simultaneously turning the steering knuckles 5 owing to the operable connection between the steering arm 10 and the guide arm 14 to in consequence position the wheels 7 at a greater angle thereby permitting of a sharp turn being made. In this connection it is to be particularly understood that as the axle 4 is turned, the arm 14 being relatively stationary with respect to the turning of the axle and being operably connected with the steering arm will cause the steering arm 10 to swing and as a result exert a turning of the knuckles 5 so as to arrange the wheels at corresponding angles to the axle 4, as is apparent, by reason of the connection of the guide arm with the bolster, so as to allow for any relative vertical movement between the parts. Likewise, the eye of the bolt 18 is shaped in position so as to admit of slight turning or swinging movement of the outer portion 12 of the arm 10 therein when the device is operated.

It is believed in view of the foregoing description that a further detailed description of the operation of the invention is entirely unnecessary. Likewise, it is believed that the advantages of the invention will be readily apparent.

Still further embodiments of the invention than those herein especially defined may be resorted to as conditions or preference may dictate, as may be in keeping with the hereto appended claims.

Having thus fully described the invention, what is claimed as new and desired to be secured by Letters Patent, is:—

1. The combination with the stationary front bolster of a vehicle, and an axle pivoted thereto, of steering knuckles pivoted to the ends of the axle and operably connected to each other, an arm connected to the bolster, another arm carried by one of said steering knuckles, and coupling means between said arms at their free ends.

2. The combination with the stationary front bolster, the pivoted axles, and the chain and drum guides of a tractor engine, of steering knuckles pivoted to the ends of the axle and operatively connected to each other, an arm connected with the bolster, a guide device at the free end of said arm, another arm carried by one of said steering knuckles and slidable through said guide device, and springs associated with the last mentioned arm and bearing against said guide device at the opposite sides thereof.

3. The combination with the stationary front bolster of a tractor engine, and an axle pivoted thereto, of steering knuckles pivoted to the ends of the axle and operatively connected to each other, a guide arm swingably connected for vertical movement to the bolster, a U-shaped steering arm joined with one of the knuckles and having its free portion operatively connected with the outer end of the guide arm to insure the turning of the knuckles simultaneously with the turning of the axle.

4. The combination with the stationary front bolster of a tractor engine, and an axle pivoted thereto, of steering knuckles pivoted to the ends of the axle and operatively connected to each other, a guide arm having its inner end pivoted for vertical movement upon the bolster, a U-shaped steering arm having one terminal joined with one of the knuckles and its free portion extending over the outer portion of the guide arm, an eye bolt carried by the outer end of the guide arm and through which the outer portion of the steering arm operates, spring tensioned means on the outer portion of the steering arm for coacting with the eye of the bolt from opposite sides in maintaining the guide arm and the steering arm in operable relation, and means for turning the axle to cause the guide arm and steering arm to swing the knuckles relative to the axle during the turning of the same.

In testimony whereof, I affix my signature hereto.

FRANK G. PROCUNIER.